(12) United States Patent
Koga et al.

(10) Patent No.: US 8,841,225 B2
(45) Date of Patent: Sep. 23, 2014

(54) DIELECTRIC CERAMIC AND LAMINATED CERAMIC CAPACITOR USING THE SAME

(71) Applicant: Murata Manufacturing Co., Ltd., Nagaokakyo (JP)

(72) Inventors: Tomomi Koga, Nagaokakyo (JP); Koichi Banno, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 0 days.

(21) Appl. No.: 13/633,317

(22) Filed: Oct. 2, 2012

(65) Prior Publication Data

US 2013/0222968 A1    Aug. 29, 2013

Related U.S. Application Data

(63) Continuation of application No. PCT/JP2011/057353, filed on Mar. 25, 2011.

(30) Foreign Application Priority Data

Apr. 2, 2010 (JP) ................................. 2010-085775

(51) Int. Cl.

| | | |
|---|---|---|
| *C04B 35/468* | (2006.01) | |
| *H01G 4/12* | (2006.01) | |
| *C04B 35/628* | (2006.01) | |
| *C04B 35/626* | (2006.01) | |
| *H01G 4/30* | (2006.01) | |
| *C04B 35/49* | (2006.01) | |
| *C01G 23/00* | (2006.01) | |

(52) U.S. Cl.

CPC .......... *H01G 4/30* (2013.01); *C04B 2235/3281* (2013.01); *C01P 2004/82* (2013.01); *C04B 35/62815* (2013.01); *C04B 35/62813* (2013.01); *H01G 4/1218* (2013.01); *C04B 35/62685* (2013.01); *C01P 2002/54* (2013.01); *C04B 2235/3256* (2013.01); *C01P 2004/64* (2013.01); *C04B 2235/5445* (2013.01); *C04B 2235/3236* (2013.01); *C04B 2235/5472* (2013.01); *C04B 35/4682* (2013.01); *C04B 2235/3217* (2013.01); *C04B 2235/6582* (2013.01); *C04B 2235/3262* (2013.01); *C04B 2235/85* (2013.01); *C04B 2235/3272* (2013.01); *C01P 2006/40* (2013.01); *C04B 2235/3206* (2013.01); *C04B 35/62826* (2013.01); *C04B 2235/6588* (2013.01); *C04B 2235/3279* (2013.01); *C04B 2235/3225* (2013.01); *H01G 4/1227* (2013.01); *C04B 2235/652* (2013.01); *C01P 2002/52* (2013.01); *C04B 35/62818* (2013.01); *C04B 2235/3224* (2013.01); *C04B 2235/3418* (2013.01); *C04B 2235/5454* (2013.01); *C04B 35/49* (2013.01); *C01P 2006/42* (2013.01); *C04B 2235/6584* (2013.01); *C01P 2002/34* (2013.01); *C04B 2235/3239* (2013.01); *C04B 2235/3249* (2013.01); *C04B 2235/3215* (2013.01); *C01P 2004/84* (2013.01); *C04B 2235/3244* (2013.01); *C01G 23/006* (2013.01); *C04B 2235/3251* (2013.01); *C04B 35/6262* (2013.01); *C04B 2235/3275* (2013.01); *C04B 2235/3241* (2013.01)

USPC ........... 501/139; 501/138; 428/404; 428/701; 361/321.4

(58) Field of Classification Search

USPC .................. 501/138, 139; 428/701, 702, 404; 361/321.4

See application file for complete search history.

(56) References Cited

U.S. PATENT DOCUMENTS

| | | | | |
|---|---|---|---|---|
| 6,489,257 | B1* | 12/2002 | Hiramatsu et al. ............ | 501/135 |
| 8,192,851 | B2* | 6/2012 | Aman et al. .................. | 428/701 |
| 8,507,395 | B2* | 8/2013 | Murakawa et al. ........... | 501/139 |
| 8,652,984 | B2* | 2/2014 | Endo et al. .................... | 501/137 |
| 2001/0021095 | A1 | 9/2001 | Mizuno et al. | |
| 2004/0038800 | A1 | 2/2004 | Horie et al. | |
| 2007/0135295 | A1* | 6/2007 | Sasabayashi et al. ......... | 501/138 |
| 2008/0226944 | A1* | 9/2008 | Aman et al. .................. | 428/697 |
| 2012/0050941 | A1* | 3/2012 | Murakawa et al. ........ | 361/321.1 |

| | FOREIGN PATENT DOCUMENTS | | |
|---|---|---|---|
| JP | 2001-230149 | A | 8/2001 |
| JP | 2001-240466 | A | 9/2001 |
| JP | 2003-277139 | A | 10/2003 |
| JP | 2006-298746 | A | 11/2006 |
| JP | 2008222520 | A | 9/2008 |

OTHER PUBLICATIONS

PCT/JP2011/057353 Written Opinion dated May 23, 2011.

\* cited by examiner

*Primary Examiner* — Karl Group
(74) *Attorney, Agent, or Firm* — Dickstein Shapiro LLP

(57) ABSTRACT

A dielectric ceramic that includes a sintered body of $BaTiO_3$ based ceramic grains, in which the ceramic grains each include a shell part as a surface layer part and a core part inside the shell part. The ceramic grains contain, as accessory constituents, R (R, which is a rare-earth element, is at least one selected from the group consisting of Nd, Sm, Eu, Gd, Tb, Dy, Ho, Er, and Y) and M (M is at least one selected from the group consisting of Mg, Mn, Ni, Co, Fe, Cr, Cu, Al, Mo, W, and V). R and M are present in the shell part of the ceramic grain, and concentrations of R and M contained in the shell part are increased from a grain boundary toward the core part.

7 Claims, 4 Drawing Sheets

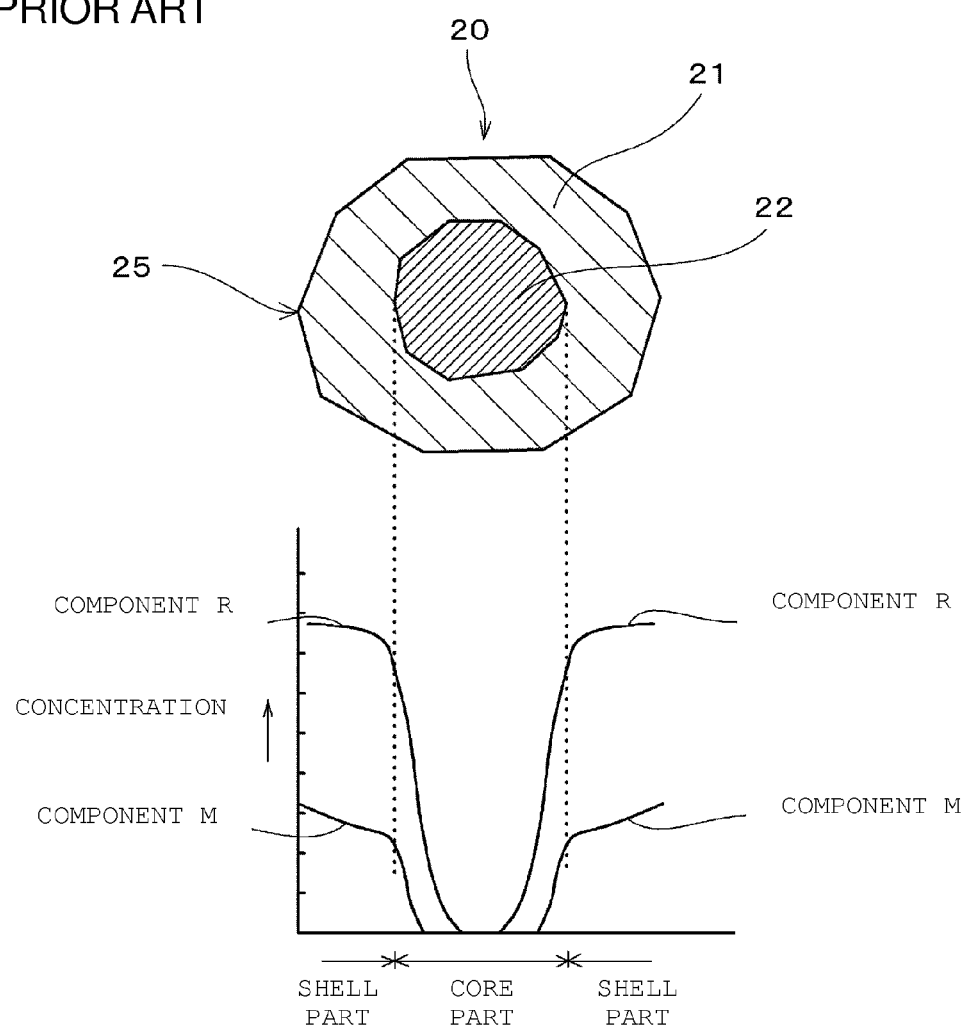

US 8,841,225 B2

DIELECTRIC CERAMIC AND LAMINATED CERAMIC CAPACITOR USING THE SAME

CROSS REFERENCE TO RELATED APPLICATIONS

The present application is a continuation of International application No. PCT/JP2011/057353, filed Mar. 25, 2011, which claims priority to Japanese Patent Application No. 2010-085775, filed Apr. 2, 2010, the entire contents of each of which are incorporated herein by reference.

FIELD OF THE INVENTION

The present invention relates to a dielectric ceramic and a capacitor using the dielectric ceramic, and more particularly, relates to a $BaTiO_3$ based dielectric ceramic and a laminated ceramic capacitor using the dielectric ceramic as a constituent material for a dielectric layer.

BACKGROUND OF THE INVENTION

In recent years, with the reduction in size and weight for electronic devices, laminated ceramic capacitors have been used widely which have a small size and allow high capacitance to be obtained. These laminated ceramic capacitors are each configured so that, for example, as shown in FIG. 1, internal electrodes 12 provided in a ceramic laminated body (laminated ceramic element) 10 are stacked with ceramic layers (dielectric ceramic layers) 11 interposed therebetween, and that a pair of external electrodes 13a, 13b are provided on both end surfaces of the ceramic laminated body 10 so as to provide electrical connections to the internal electrodes 12 exposed alternately at the opposite end surfaces.

Further, in these laminated ceramic capacitors, $BaTiO_3$ based ceramic materials which have a high dielectric constant are commonly used as the dielectric layers.

Furthermore, as the $BaTiO_3$ based ceramic materials, those with various accessory constituents, for example, rare-earth elements, Mg, etc. added are used for the purpose of improving characteristics such as temperature characteristics, insulation properties, reliability (life characteristics).

In addition, in order to achieve a balance between temperature characteristics and reliability (life characteristics) while keeping the temperature characteristics and reliability controllable, a crystal structure referred to as a so-called core-shell structure has been also adopted in which accessory constituents are mostly present as a solid solution in surface layer parts of ceramic grains (crystal grains), whereas the accessory constituents are hardly present as a solid solution in the crystal grains.

For example, Patent Document 1 proposes a laminated ceramic capacitor in which dielectric layers are composed of a sintered body of ceramic grains including a core part and a shell part surrounding the core part, the shell part of the ceramic grains contains: one or two or more acceptor elements selected from Mn, V, Cr, Co, Fe, Ni, Cu, and Mo; Mg; and a rare-earth element (Ho, Sc, Y, Gd, Dy, Er, Yb, Tb, Tm, Lu), and the concentration of the acceptor elements contained in the shell part is increased from the core-shell boundary toward the grain boundary (see Patent Document 1).

However, in the case of a laminated ceramic capacitor using, for dielectric layers, such a ceramic dielectric as disclosed in Patent Document 1, the use of the capacitor, for example, under an environment at a high temperature or a high electric field intensity has the problem of decreased reliability (life characteristics). Therefore, the development of dielectric materials has been actually desired which are able to constitute laminated ceramic capacitors which are further excellent in life characteristics.

Patent Document 1: Japanese Patent Application Laid-Open No. 2001-230149

SUMMARY OF THE INVENTION

The present invention is intended to solve the problem described above, and an object of the present invention is to provide a dielectric ceramic capacitor which is able to achieve a laminated ceramic capacitor with excellent life characteristics when the dielectric ceramic is used as dielectric layers for the laminated ceramic capacitor, and a laminated ceramic capacitor which has dielectric layers formed with the use of the dielectric ceramic and has excellent reliability (life characteristics).

In order to solve the problem described above, a dielectric ceramic according to the present invention comprises:

a sintered body including $BaTiO_3$ based ceramic grains as main phase grains, in which the ceramic grains each include a shell part as a surface layer part and a core part inside the shell part, the ceramic grains contain, as accessory constituents, R (R, which is a rare-earth element, is at least one selected from the group consisting of Nd, Sm, Eu, Gd, Tb, Dy, Ho, Er, and Y) and M (M is at least one selected from the group consisting of Mg, Mn, Ni, Co, Fe, Cr, Cu, Al, Mo, W, and V), the R and the M are present in the shell part of the ceramic grain, and concentrations of the R and the M contained in the shell part are increased from a grain boundary toward the core part.

In the dielectric ceramic according to the present invention, some of Ba constituting the $BaTiO_3$ as a perovskite-type compound may be substituted with Ca, Sr, and some of Ti constituting the $BaTiO_3$ may be substituted with Zr. More specifically, some of the Ba may be substituted with Ca, Sr, and some of the Ti may be substituted with Zr. Alternatively, only either one of the Ba and the Ti may be substituted with the constituent mentioned above.

In addition, a laminated ceramic capacitor according to the present invention is a laminated ceramic capacitor having a structure in which a plurality of dielectric layers and a plurality of internal electrodes are stacked integrally.

The dielectric ceramic according to the present invention comprises: the sintered body including the $BaTiO_3$ based ceramic grains as main phase grains, in which the ceramic grains each include the shell part as a surface layer part and the core part inside the shell part, the ceramic grains contain, as accessory constituents, R (R, which is a rare-earth element, is at least one selected from the group consisting of Nd, Sm, Eu, Gd, Tb, Dy, Ho, Er, and Y) and M (M is at least one selected from the group consisting of Mg, Mn, Ni, Co, Fe, Cr, Cu, Al, Mo, W, and V), the R and the M are present in the surface layer part of the ceramic grain, and the concentrations of the R and the M contained in the shell part are increased from the grain boundary toward the core part. Thus, the formation of dielectric layers with the use of the dielectric ceramic according to the present invention can provide a laminated ceramic capacitor which is able to ensure favorable reliability (life characteristics) even under an environment at a high temperature or a high electric field intensity.

It is to be noted that the feature that "the concentrations of the R and the M contained in the shell part are increased from the grain boundary toward the core part" in the present invention means that the concentrations of the R and the M in the shell part show an upward tendency as a whole, and is not intended to preclude cases including a portion in which the concentrations of the R and the M are partially decreased in the process from the grain boundary toward the core part.

In addition, in the present invention, for both of the R and the M contained in the shell part, a point (a higher concentration point) with a concentration higher by 20% or more with respect to the concentration in a position 5 nm inside from the grain boundary is preferably present in the vicinity of the boundary between the core part and the shell part.

In addition, the present invention makes it possible to achieve a dielectric ceramic which has desired characteristics by controlling the characteristics in such a way that some of Ba is substituted with Ca, Sr, whereas some of Ti is substituted with Zr.

It is to be noted that the substitution of either some of Ba with Ca, Sr, or some of Ti with Zr may be carried out, or the substitution of both Ba and Ti may be carried out.

In addition, the laminated ceramic capacitor according to the present invention has the dielectric layers formed from the dielectric ceramic according to the present invention, thus can achieve favorable reliability (life characteristics), even under an environment at a high temperature or a high electric field intensity.

BRIEF EXPLANATION OF THE DRAWINGS

FIG. 5 is a diagram for explaining concentration distributions of accessory constituents in ceramic grains for forming dielectric layers of a laminated ceramic capacitor according to a comparative example which fails to meet the requirements of the present invention.

DETAILED DESCRIPTION THE INVENTION

Figure 1:
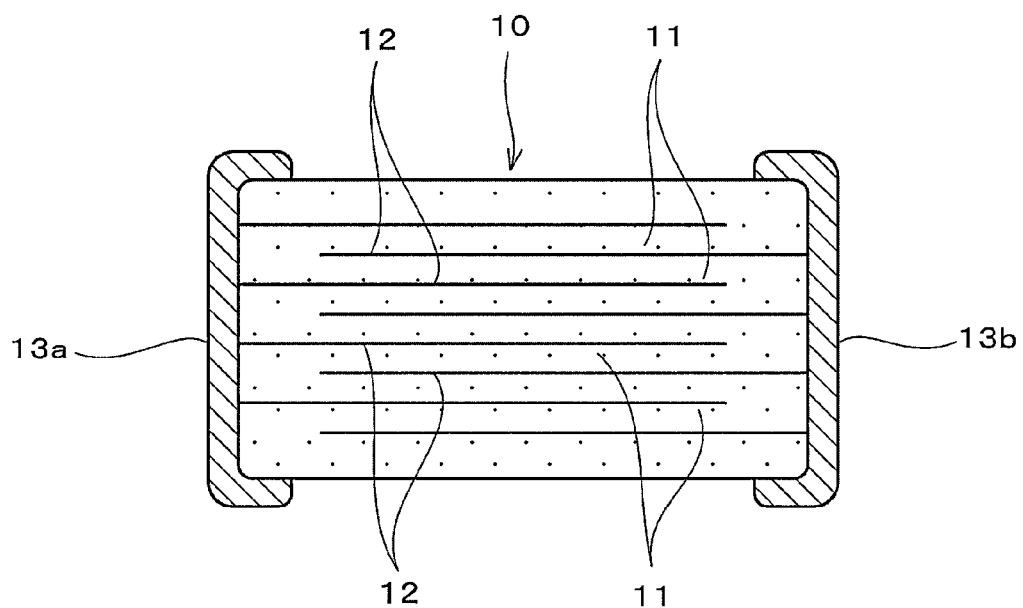
FIG. 1 is a cross-sectional view illustrating the configuration of a laminated ceramic capacitor according to an example of the present invention.

With reference to examples of the present invention, features of the present invention will be described below in detail.

EXAMPLE 1

(A) Preparation of Dielectric Ceramic Raw Material

First, a $BaTiO_3$ powder of 200 nm in average grain size ($BaTiO_3$ powder A) was prepared as a main constituent raw material. This $BaTiO_3$ powder A, to which an oxide powder for the component M listed in Table 1 and an oxide powder for the component R listed in Table 1 were added, was mixed for 12 hours in pure water with the use of a ball mill, and dried.

It is to be noted that the amount of the component M in Table 1 is 1.5 parts by mol (a preferable range is 0.5 to 5 parts by mol) with respect to 100 parts by mol of $BaTiO_3$ (whole) with the component M and the component R added thereto, whereas the amount of the component R is 10 parts by mol (a preferable range is 1 to 15 parts by mol) with respect to 100 parts by mol of $BaTiO_3$ (whole) with the component M and the component R added thereto.

Then, this mixed powder was subjected to calcination at 1,000° C., and the calcined body obtained was subjected to grinding down to primary grains, thereby providing a calcined raw material powder. It is to be noted that the primary grains of this calcined raw material powder have grain sizes approximated to the average grain size (200 nm) of the $BaTiO_3$ powder of 200 nm in average grain size, which was used as the main constituent raw material.

Next, the calcined raw material powder obtained in the way described above, to which a $BaTiO_3$ powder of 50 nm in average grain size ($BaTiO_3$ powder B) and a $SiO_2$ powder were added with pure water as a medium, was mixed for 12 hours with the use of a ball mill. Then, evaporative drying was carried out, thereby providing dielectric ceramic raw materials according to sample numbers 1 to 19 in the table.

It is to be noted that the combination ratio (molar ratio) of the $BaTiO_3$ powder B of 50 nm in average grain size to the $BaTiO_3$ powder A of 200 nm in average grain size is $BaTiO_3$ powder A:$BaTiO_3$ powder B=8:2.

In addition, for comparison, a dielectric ceramic raw material of sample number 20 in Table 1 was prepared as a dielectric ceramic raw material without the addition of the $BaTiO_3$ powder B of 50 nm in average grain size (more specifically, a dielectric ceramic raw material for comparison without meeting the requirements of the present invention at $BaTiO_3$ powder A:$BaTiO_3$ powder B=10:0 (molar ratio)).

It is to be noted that the $BaTiO_3$ powder A as a main constituent raw material and the $BaTiO_3$ powder B for an additive are not particularly limited in production method thereof, and it is possible to use $BaTiO_3$ powders prepared by any method such as a solid-phase synthesis method, a hydrothermal synthesis method, and a hydrolysis method.

In addition, the compounds of the raw materials and accessory constituents for use in the preparation of the $BaTiO_3$ powders A and B are also not particularly limited in form, and it is possible to use various compounds such as oxides and carbonates, as well as chlorides and metal organic compounds.

(B) Preparation of Laminated Ceramic Capacitor

The dielectric ceramic raw material prepared in the step (A), with the addition of a polyvinyl butyral based binder and an organic solvent (ethanol in Example 1 herein), was subjected to wet mixing for a predetermined period of time with the use of a ball mill, thereby preparing ceramic slurry.

This ceramic slurry was subjected to sheet forming by a Lip method, thereby providing ceramic green sheets so as to achieve a dielectric element thickness of 10 μm after firing.

Next, a conductive paste including a nickel powder as a conductive component was applied by screen printing onto the ceramic green sheets, thereby forming conductive paste layers (internal electrode patterns) to serve as internal electrodes after firing.

Thereafter, the ceramic green sheets with the internal electrode patterns formed thereon were stacked in such a manner that the internal electrode patterns were alternately extracted to the opposite sides, and so that the number of effective dielectric layers (capacitor forming layers) was 10, and furthermore, ceramic green sheets with no conductive paste pattern formed were stacked as outer layers on the both upper and lower surfaces, thereby preparing a laminated block.

Then, an unfired laminated body obtained by cutting the laminated block into a predetermined size was heated to 300° C. in the atmosphere to burn the binder, and then subjected to firing under the condition of 1,200° C. for 2 hours in a $H_2$—$N_2$—$H_2O$ gas atmosphere (reducing atmosphere) with an oxygen partial pressure of $10^{-10}$ MPa, thereby providing a fired laminated body (ceramic laminated body).

Then, a conductive paste containing $B_2O_3$—$Li_2O$—$SiO_2$—BaO based glass frit and containing a copper powder as a conductive component was applied onto both end surfaces of the fired laminated body with the internal electrodes extracted thereto, and subjected to firing at 800° C., thereby forming external electrodes electrically connected to the internal electrodes.

Thus, as schematically illustrated in FIG. 1, a laminated ceramic capacitor was obtained which was configured so that internal electrodes 12 provided in a laminated ceramic element (ceramic sintered body) 10 were stacked with dielectric layers (dielectric ceramic layers) 11 interposed therebetween, and that a pair of external electrodes 13a, 13b were provided on both end surfaces of the laminated ceramic element 10 so as to provide electrical connections to the internal electrodes 12 exposed alternately at the opposite end surfaces.

Further, the laminated ceramic capacitor obtained had outside dimensions of length: 2.0 mm, width: 1.2 mm, and thickness: 1.0 mm, and the dielectric layers (dielectric ceramic layers) 11 interposed between the internal electrodes 12 had a thickness of 10 μm.

In addition, the total number of effective dielectric layers (capacitor forming layers) was 10, and the area of the electrode opposed per layer was 1.4 $mm^2$.

(C) Measurement of Characteristics, Structure Analysis of Dielectric Ceramic Layer, and Evaluation (1) Measurement of Characteristics
(a) Relative Permittivity For the samples (laminated ceramic capacitors) prepared in the way described above, the electrostatic capacitance was measured under the conditions of 1 kHz and 1 Vrms, and the relative permittivity was calculated from the value of the electrostatic capacitance obtained. The results are shown in Table 1.

(b) Reliability (Life Characteristics)

For each of the samples (laminated ceramic capacitors) prepared in the way described above, 10 pieces were prepared, and for the respective 10 pieces of samples, a high-temperature accelerated life test (HALT) in which a voltage DC of 400 V was applied at a temperature of 170° C. was carried out to measure the time until the insulation resistance value was decreased down to 100 kΩ or less as time to failure, and figure out the mean time to failure (MTTF) from the measured values. The results are shown in Table 1.

TABLE 1

| Sample Number | Component R | Component M | Relative Permittivity | Mean Time To Failure 170° C.-400 V (time) |
|---|---|---|---|---|
| 1 | Dy | Mg | 3500 | 320 |
| 2 | DY | Mn | 3480 | 280 |
| 3 | Dy | Co | 3600 | 280 |
| 4 | Y | Ni | 3200 | 260 |
| 5 | Y | Al | 3500 | 270 |
| 6 | Y | Mo | 3400 | 280 |
| 7 | Gd | W | 3600 | 320 |
| 8 | Gd | Mn | 3700 | 400 |
| 9 | Gd | Mg | 3500 | 460 |
| 10 | Ho | V | 3200 | 350 |
| 11 | Ho | Co | 3300 | 320 |
| 12 | Ho | Al | 3600 | 360 |
| 13 | Nd | Fe | 3200 | 320 |
| 14 | Nd | V | 3300 | 350 |
| 15 | Er | Al | 3500 | 280 |
| 16 | Er | Cr | 3600 | 290 |
| 17 | Sm | Cu | 3550 | 270 |
| 18 | Eu | Ni | 3460 | 260 |
| 19 | Tb | Cu | 3400 | 270 |
| *20 | Dy | Mg | 3500 | 110 |

* The sample of sample number 20 refers to a sample which fails to meet the requirements of the present invention, without the subsequent addition of the $BaTiO_3$ powder.

(2) Structure Analysis of Dielectric Ceramic Layer

For the samples (laminated ceramic capacitors) prepared in the way described above, the component R and the component M in the dielectric ceramic layer were quantified by energy dispersive X-ray spectrometry (TEM-EDX) with the use of a probe of 2 nm, to observe the respective concentration distributions.

(3) Evaluation

As shown in Table 1, it has been confirmed that the MTTF (mean time to failure) at 170° C. and 400 V achieves a high level of 250 hours or more in the case of the respective samples of sample numbers 1 to 19, which are samples according to the example which meet the requirements of the present invention. Thus, it is determined that favorable reliability (life characteristics) can be achieved, even under an environment at a high temperature or a high electric field intensity.

In addition, it has been confirmed that there is no decrease caused in relative permittivity, because the value of the relative permittivity for each sample of sample numbers 1 to 19 is equivalent to that in the case of the sample of sample number 20 (sample for comparison) without the addition (subsequent addition) of the $BaTiO_3$ powder B of 50 nm in average grain size.

Figure 2:
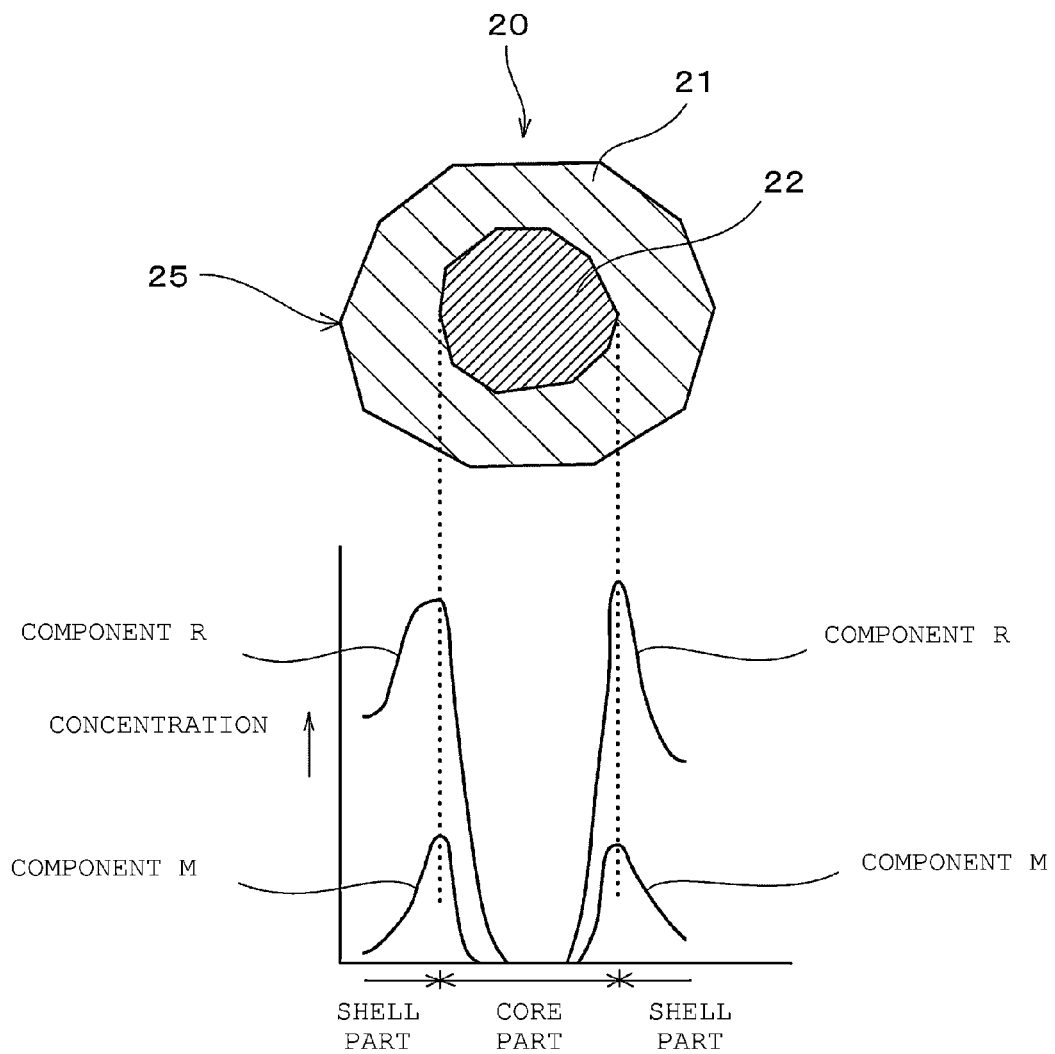
FIG. 2 is a diagram for explaining concentration distributions of accessory constituents in ceramic grains for forming dielectric layers of a laminated ceramic capacitor according to an example of the present invention.

In addition, as a result of the structure analysis by the TEM-EDX, it has been confirmed that the respective samples of sample numbers 1 to 19 meet the requirements of the present invention: as schematically illustrated in FIG. 2, the component R and the component M are detected in a shell part 21 of a ceramic grain 20; while the concentrations of the component R and the component M are increased from a grain boundary 25 toward a core part 22.

This is considered to be because, in the case of the samples of sample numbers 1 to 19, due to the fact that the $BaTiO_3$ powder B of 50 nm in average grain size without containing the component R and the component M (accessory constituents) was added (the $BaTiO_3$ powder B was subsequently added) to the calcined main constituent raw material powder ($BaTiO_3$) with the component R and the component M as accessory constituents dispersed in the shell part, the $BaTiO_3$ derived from the subsequently added $BaTiO_3$ powder B was diffused into the calcined main constituent raw material powder ($BaTiO_3$) with the component R and the component M as accessory constituents dispersed in the shell part, thereby decreasing the concentrations of the component R and the component M in a portion of the shell part close to the grain boundary, and thus relatively increasing the concentrations of R and M contained in the shell part from the grain boundary toward the core part.

Figure 3:
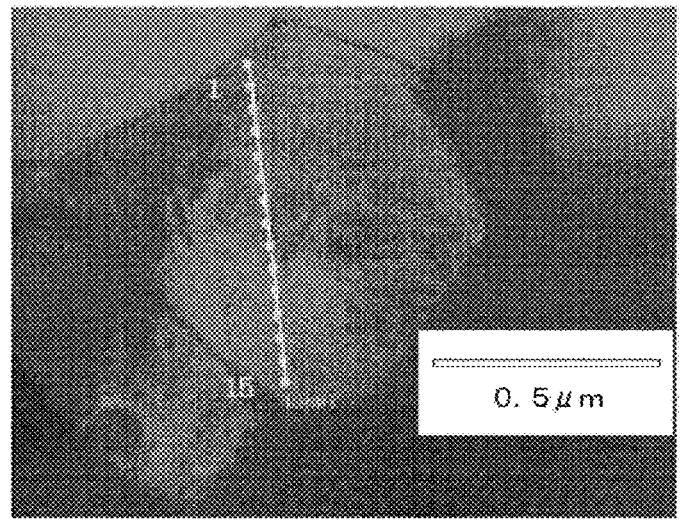
FIG. 3 is a micrograph of a dielectric ceramic layer in a sample of sample number 9 (a sample which meets the requirements of the present invention) in Table 1.
Figure 4:
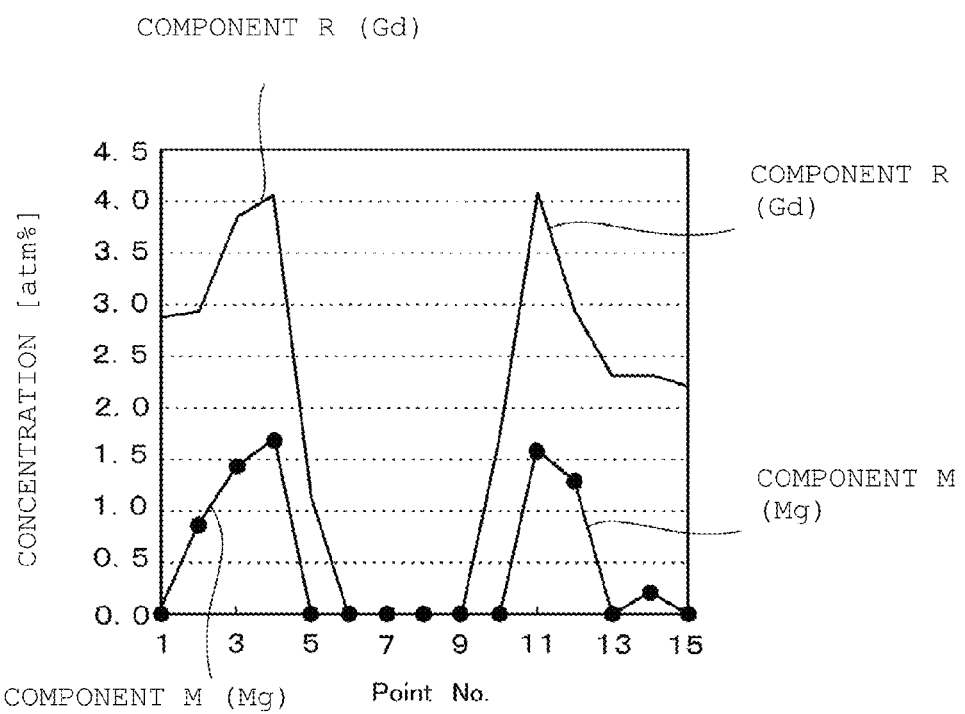
FIG. 4 is a diagram showing the concentrations of Gd as a component R and of Mg as a component M at each of points 1 to 15 shown in FIG. 3.

Further, FIG. 3 is a micrograph of the sample of sample number 9 which meets the requirements of the present invention, and FIG. 4 is a diagram showing the concentrations of Gd as the component R and of Mg as the component M at each of points 1 to 15 shown in FIG. 3.

As shown in FIGS. 3 and 4, from the concentrations of Gd as the component R and of Mg as the component M in ceramic grains constituting the dielectric ceramic layers of the laminated ceramic capacitor according to the example of the present invention (sample of sample number 9) at the points 1 to 15, it is also determined that the concentrations of the component R (Gd) and the component M (Mg) are increased from the grain boundary 25 toward the core part 22.

On the other hand, in the case of the sample of sample number 20 without the addition (subsequent addition) of the $BaTiO_3$ powder B of 50 nm in average grain size, it has been confirmed that the MTTF (mean time to failure) of 110 hours is significantly shorter as compared with the samples which meet the requirements of the present invention. It is to be noted that the value of the relative permittivity is 3,500, which is equivalent to the values for the samples of sample numbers 1 to 19 which meet the requirements of the present invention.

In addition, as a result of the structure analysis carried out by TEM-EDX for the sample of sample number 20, as shown in FIG. 5, the component R and the component M are detected in a shell part 21 of a ceramic grain 20, while the concentrations of the components each have a tendency to decrease from a grain boundary 25 toward the vicinity of a core part 22.

This is because the effect of the $BaTiO_3$ powder B added subsequently is not achieved which is achieved in the case of the samples of sample numbers 1 to 19 described above, due to the fact that the $BaTiO_3$ powder B of 50 nm in average grain size was not added (subsequently added) in the case of the sample of sample number 20.

EXAMPLE 2

(A) Preparation of Dielectric Ceramic Raw Material

In Example 2 herein, a $BaTiO_3$ powder A' with some of Ti substituted with Zr, that is, a $Ba(Ti_{1-x}Zr_x)O_3$ powder was prepared as a main constituent raw material (starting raw material). It is to be noted that the value of x (that is, the ratio of Ti:Zr) in the $Ba(Ti_{1-x}Zr_x)O_3$ was varied in the range of Ti:Zr=100:0 to 70:30, as shown in Table 2.

In addition, prepared as a subsequently added $BaTiO_3$ powder B' was also the same $BaTiO_3$ powder B' as the $BaTiO_3$ powder A' with some of Ti substituted with Zr as a main constituent raw material.

It is to be noted that the component R was fixed to Gd, whereas the component M was fixed to Mg in Example 2 herein.

Then, except for the use of the $BaTiO_3$ powders A' and B' as described above, dielectric ceramic raw materials for sample numbers 21 to 25 in Table 2 were prepared by the same method and under the same conductions as in the case of Example 1 described above.

In addition, for comparison, a dielectric ceramic raw material of sample number 26 in Table 2 was prepared as a dielectric ceramic raw material without the subsequent addition of the $BaTiO_3$ powder B' of 50 nm in average grain size (more specifically, a dielectric ceramic raw material for comparison without meeting the requirements of the present invention at $BaTiO_3$ powder A':$BaTiO_3$ powder B'=10:0 (molar ratio)).

(B) Preparation of Laminated Ceramic Capacitor

Except for the use of the respective dielectric ceramic raw materials prepared in the step (A), the respective samples (dielectric ceramic capacitors) of sample numbers 21 to 26 in Table 2 were prepared by the same method and under the same conductions as in the case of Example 1 described above.

(C) Measurement of Characteristics, Structure Analysis of Dielectric Ceramic Layer, and Evaluation The samples of sample numbers 21 to 26 in Table 2 were subjected to the measurements of the characteristics and the structure analysis of the dielectric ceramic layers by the same methods and under the same conditions as in the case of Example 1 described above.

The results are shown in Table 2.

TABLE 2

| Sample Number | Ti:Zr Ratio | Component R | Component M | Relative Permittivity | Mean Time To Failure 170° C.-400 V (time) |
|---|---|---|---|---|---|
| 21 | 100:0 | Gd | Mg | 3500 | 460 |
| 22 | 95:5 | Gd | Mg | 2700 | 500 |
| 23 | 90:10 | Gd | Mg | 1500 | 540 |
| 24 | 80:20 | Gd | Mg | 1200 | 530 |
| 25 | 70:30 | Gd | Mg | 800 | 540 |
| *26 | 95:5 | Gd | Mg | 2800 | 100 |

*The sample of sample number 26 refers to a sample which fails to meet the requirements of the present invention, without the subsequent addition of the $BaTiO_3$ powder.

As shown in Table 2, it has been confirmed that the MTTF (mean time to failure) at 170° C. and 400 V achieves a high level of 250 hours or more in the case of the respective samples of sample numbers 21 to 25 which meet the requirements of the present invention (the laminated ceramic capacitor according to the example of the present invention). Thus, it is determined that favorable reliability (life characteristics) can be achieved, even under an environment at a high temperature or a high electric field intensity.

Further, the relative permittivity has a low value, for example, in the case of the samples of sample numbers 23 to 25, because of the use of $BaTiO_3$ powder with some of Ti substituted with Zr. It is to be noted that even if the relative permittivity is low, depending on other characteristics, for example, characteristics such as voltage resistance characteristics and life characteristics, the use for appropriate purposes is possible, and the low relative permittivity is thus not to be considered always defective.

In addition, as a result of the structure analysis by TEM-EDX, although not particularly shown, it has been confirmed that the respective samples of sample numbers 21 to 25 achieve capacitors including a structure which meets the requirements of the present invention: the component R and the component M are detected in a shell part of a ceramic grain, while the concentrations of the component R and component M are increased from a grain boundary toward a core part.

This is considered to be because, as in the case of the samples of sample numbers 1 to 19 in Table 1 according to Example 1, in the case of the samples of sample numbers 21 to 25, due to the fact that the $BaTiO_3$ powder B' of 50 nm in average grain size was added subsequently, the $BaTiO_3$ derived from the subsequently added $BaTiO_3$ powder B' was diffused into the calcined main constituent raw material powder ($BaTiO_3$ A') with the component R and the component M as accessory constituents dispersed in the shell part, thereby decreasing the concentrations of the component R and the component M in a portion of the shell part close to the grain boundary, and thus relatively increasing the concentrations of R and M contained in the shell part from the grain boundary toward the core part.

On the other hand, in the case of the sample of sample number 26, only with 5% of Ti substituted with Zr (Ti:Zr=95: 5), it has been thus confirmed that the MTTF (mean time to failure) of 100 hours is significantly shorter as compared with the samples which meet the requirements of the present invention, while the value of relative permittivity is 2,800, which is equivalent to the relative permittivity of the sample of sample number 22 (Ti:Zr=95:5) with 5% of Ti substituted with Zr, which meets the requirements of the present invention.

In addition, as a result of the structure analysis carried out by TEM-EDX for the sample of sample number 26, the component R and the component M are detected in a shell part, while the concentrations of the components each have a tendency to decrease from a grain boundary toward the vicinity of a core part.

This is because the effect of the $BaTiO_3$ added subsequently is not achieved which is achieved in the case of the samples of sample numbers 21 to 25, due to the fact that the $BaTiO_3$ powder B' of 50 nm in average grain size was not subsequently added in the case of the sample of sample number 26.

It is to be noted that while the case in which some of Ti constituting the $BaTiO_3$ based ceramic is substituted with Zr has been described as an example in Example 2, it is also possible to adopt a composition with some of Ba substituted with Ca and/or Sr, and it is also possible to adopt a composition with some of Ba substituted with Ca and/or Sr, and with some of Ti substituted with Zr.

In addition, while the subsequent addition of the $BaTiO_3$ powder B with a small average grain size without containing the component R and the component M (accessory constituents) in Example 1, and the subsequent addition of the $BaTiO_3$ powder B' in Example 2 achieved such a composition that has the concentrations of the component R and the component M increased from the grain boundary toward the core part in the shell part of the ceramic grain, the means is not particularly limited for achieving such a composition that has the concentrations of the component R and the component M increased from the grain boundary toward the core part, and it is also possible to achieve such a composition that has the concentrations of the component R and the component M increased from the grain boundary toward the core part, even by a method of preparing the composition of the subsequently added $BaTiO_3$ powder, the conditions for firing, and the like.

It is to be noted that it is possible to apply the dielectric ceramic according to the present invention to not only laminated ceramic capacitors but also LC composite components, etc.

The present invention is not to be considered limited to the examples described above in other respects, and various applications and modifications can be made within the scope of the invention, in terms of the types of the respective raw materials, the conditions in the calcination step, the ratio of the accessory constituents, etc. in the case of producing the dielectric ceramic according to the present invention.

DESCRIPTION OF REFERENCE SYMBOLS 10 laminated ceramic element
11 ceramic layer
12 internal electrode layer
13a, 13b external electrode
20 ceramic grain
21 shell part
22 core part
25 grain boundary

The invention claimed is:

1. A dielectric ceramic comprising a sintered body including $BaTiO_3$ based ceramic grains as main phase grains,
wherein the ceramic grains each include a shell part as a surface layer part and a core part inside the shell part,
the ceramic grains contain, as accessory constituents, R and M,
R is at least one rare-earth element selected from the group consisting of Nd, Sm, Eu, Gd, Tb, Dy, Ho, Er, and Y,
M is at least one element selected from the group consisting of Mg, Mn, Ni, Co, Fe, Cr, Cu, Al, Mo, W, and V,
the R and the M are present in the shell part of the ceramic grain,
concentrations of the R and the M contained in the shell part increase from a grain boundary toward the core part,
a concentration of the R at the grain boundary<a concentration of the R at a core-shell boundary, and
a concentration of the M at the grain boundary<a concentration of the M at the core-shell boundary.

2. The dielectric ceramic according to claim 1, wherein some of Ba in the $BaTiO_3$ based ceramic grains is substituted with Ca or Sr.

3. The dielectric ceramic according to claim 2, wherein some of the Ti in the $BaTiO_3$ based ceramic grains is substituted with Zr.

4. The dielectric ceramic according to claim 1, wherein some of the Ti in the $BaTiO_3$ based ceramic grains is substituted with Zr.

5. The dielectric ceramic according to claim 1, wherein the $BaTiO_3$ based ceramic grains are formed from a ceramic raw material that comprises a first $BaTiO_3$ powder having an average grain size of 200 nm and a second $BaTiO_3$ powder having an average grain size of 50 nm.

6. The dielectric ceramic according to claim 5, wherein a ratio of the first $BaTiO_3$ powder to the second $BaTiO_3$ powder is 8 to 2.

7. A laminated ceramic capacitor comprising:
a structure in which a plurality of dielectric layers and a plurality of internal electrodes are stacked,
wherein the dielectric layers comprise the dielectric ceramic according to claim 1.

* * * * *